June 21, 1955  J. W. DELAPLAINE  2,711,350
LIFT FOR ELEVATING GRANULAR SOLIDS
Filed Nov. 19, 1949  2 Sheets-Sheet 2

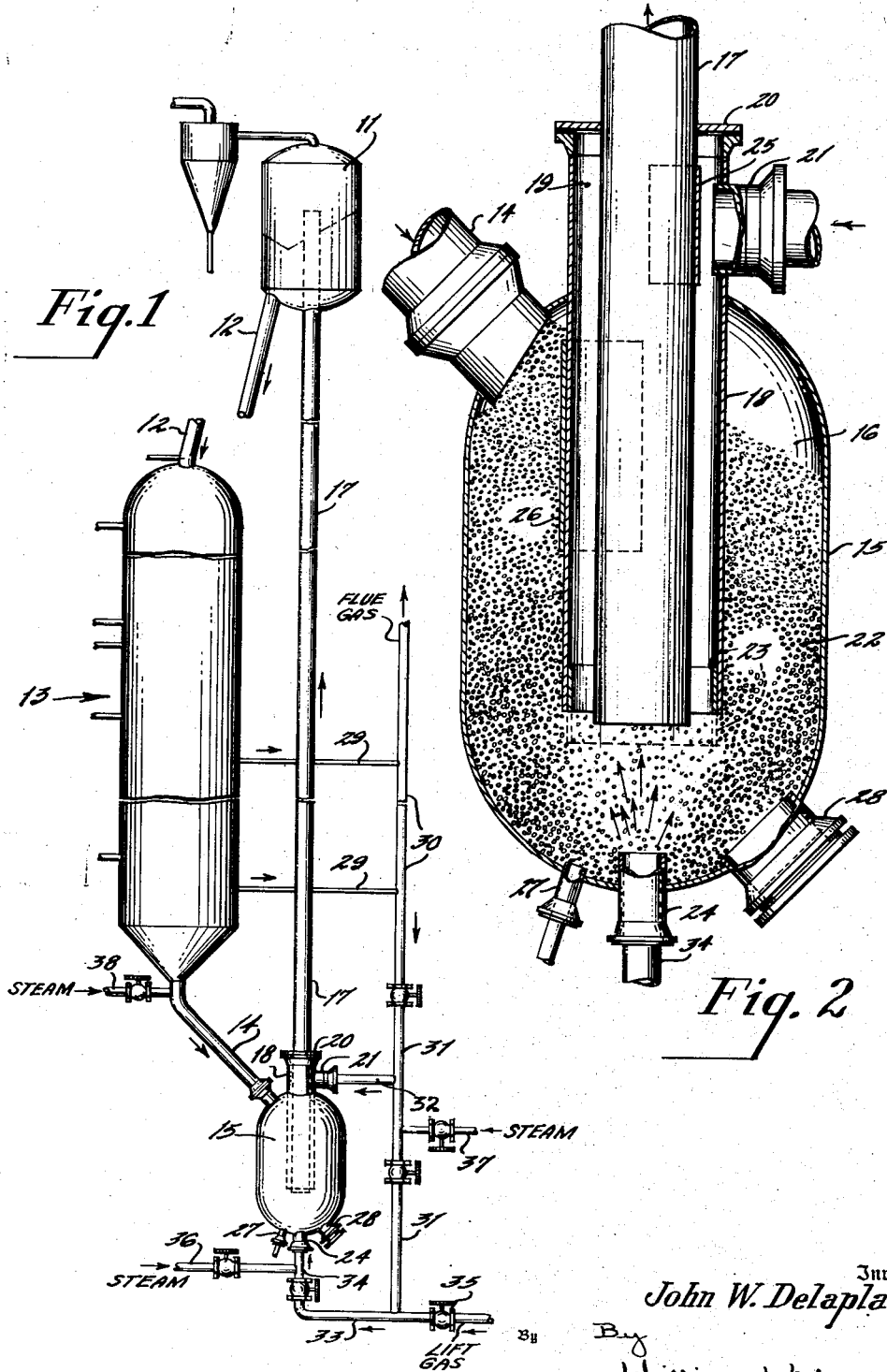

INVENTOR
John W. Delaplaine
BY
William Klabunde
ATTORNEY

United States Patent Office 2,711,350
Patented June 21, 1955

2,711,350

LIFT FOR ELEVATING GRANULAR SOLIDS

John W. Delaplaine, Swarthmore, Pa., assignor to Houdry Process Corporation, Wilmington, Del., a corporation of Delaware Application November 19, 1949, Serial No. 128,363

3 Claims. (Cl. 302—53)

This invention relates to a method and apparatus for elevating granular solid material by suspension in a rising gaseous stream or gas lift, and is particularly adapted for use in systems commonly employed in the chemical processing and oil refining industries wherein particulate solid material is passed through one or more processing or contacting zones in a cyclic procedure, the granular solid material functioning, for example, as a catalyst or as a contact material for other desirable purposes.

The invention is especially applicable to systems involving the catalytic conversion of petroleum, and for the purpose of illustrating the invention in one of its preferred applications it will be hereinafter described in connection with a catalytic cracking system for the conversion of hydrocarbons in the production of motor gasoline in which the solid material is of a catalytic nature and is employed in the form of relatively large aggregates or agglomerated masses, such as pellets, beads, coarse granules or the like having a particle size in the range between 0.05 and 0.5 of an inch, or having, for example, an average particle size in the order of 14 mesh or larger.

In conversion systems employing catalyst in the above-mentioned size range, the catalyst is commonly withdrawn from an elevated source of supply and passed downwardly by gravity flow in the form of a compact moving bed through one or more treating zones wherein the catalyst may be contacted with the hydrocarbons under suitable conditions to carry out the desired reaction, or wherein the catalyst itself may be treated, as in a regenerator or kiln, to condition it for further use. The gravitating catalyst withdrawn from the lowermost treating zone is then reelevated to the source of supply and recycled through the system.

Various methods and means for returning the catalyst to its elevated source of supply are well known, a typical method being the mechanical conveyance of the material upwardly in a conveyor comprising an endless chain of buckets which pick up the catalyst from a lower hopper and elevate it to the source. A typical system involving the gravitational feed of granular catalyst as a moving non-turbulent bed through contact zones, and the subsequent elevation of the catalytic material from its point of discharge to its initial elevated position by means of mechanical elevating means, is discussed generally in an article entitled "The T. C. C. catalytic cracking process for motor gasoline production," by R. H. Newton, G. S. Dunham and T. P. Simpson, recorded in the "Transactions of the American Institute of Chemical Engineers," volume 41, page 215, April 25, 1945, and in other articles therein cited.

It has further been proposed to overcome the various disadvantages inherent in mechanical lifts operating through relatively long vertical distances, such as those required in oil refinery installations, by substituting pneumatic lifts. In a typical pneumatic lift, solid catalytic particles withdrawn by gravity flow from the lowermost treating or contact zone are introduced into an engaging zone in which they are picked up by or injected into a gaseous stream and conveyed upwardly by suspension therein through a vertical lift pipe to an elevated separating zone. The solid particles are separated from the gas stream within the latter zone and are then passed downwardly again through the various treating zones in a cyclic procedure. The invention will hereinafter be described particularly in connection with the latter type of system, a fuller description of which is given in an article entitled "Houdriflow: New design in catalytic cracking," appearing at page 78 of the January 13, 1949, issue of the "Oil and Gas Journal." This design comprises briefly a superimposed self-supporting circular reactor and regenerator section through which the catalyst in the form of beads or pellets is passed by gravity flow. The catalyst is supplied to the system from an upper lift hopper disposed at an elevation substantially above the combined reactor and regenerator section and, after discharging from the latter, the catalyst is passed downwardly into a lower lift hopper. The lower lift hopper includes an engaging zone in which the catalyst is introduced into a stream of gas, such as flue gas, air, steam, etc. and conveyed thereby upwardly through a lift pipe to the upper lift hopper, which includes a disengaging zone for separating the catalyst from the lift gas.

The present invention is directed specifically to an improved method and suitable apparatus for effecting contact between the granular material, such as catalyst, and the lift gas within the engaging zone, and for introducing the mixture of gas and catalyst into one or more confined lift paths.

In accordance with a preferred embodiment of the invention, catalyst discharging in a continuous stream from the combined reactor-regenerator is introduced through a seal leg into the upper portion of a confined engaging zone within the lower lift hopper wherein the catalyst gravitates as a compact non-turbulent moving bed. The lower end of the lift path terminates at a low point within the engaging zone, below the surface of the downwardly moving catalyst bed, so that the catalyst enters the lift path by passing laterally under the lower periphery thereof and then upwardly into the open end of the lift path. Obviously there will be a region at the bottom of the compact bed in which, dependent upon the vertical spacing between the inlet to the lift path and the bottom of the engaging zone, and the extent of the region wherein the introduced lift gas is effective as a motivating force, the catalyst will be relatively stagnant or non-flowing. Above this region the catalyst flowing inwardly below the lower end of the confined lift path and toward the extended axis thereof will tend to form an internal exposed surface of the bed having the contour of an inverted cone whose sides are inclined at the angle of repose for the particular granular material. Reference herein to the "compact bed" in connection with the introduction of lift gas denotes the entire compact mass of catalyst within the engager, that is, the portion gravitating as a compact annular stream about the lift path, together with the portions of relatively compact material laterally surrounding and directly beneath the cone of repose.

Lift gas from an external source is introduced into the engaging zone through a confined path terminating adjacent the lower end of the lift path. The lift gas discharges downwardly in a uniform stream about the lower periphery of the lift path, so as to merge with the catalyst stream as the latter moves laterally toward the lift path. In other words, the downwardly discharging gas stream is between the downwardly moving compact bed of catalyst and the upwardly moving mixture of catalyst and lift gas in the lift path. While a suitable arrangement is to have the lift path centrally disposed within the engaging zone, so that the lift gas and the catalyst flow downwardly in separate confined annular streams surrounding the lift path in the order named, alternatively the paths may comprise an adjacent parallel series, with the lift gas being introduced between the downwardly moving catalyst bed and the lift path in a stream horizontally coextensive with the catalyst stream passing laterally toward and upwardly into the lift path.

In accordance with the invention, lift gas is introduced into the catalyst engaging zone below the normal surface of the compact moving bed of catalyst at a point adjacent the lower periphery of the lift path.

Additional lift gas may be introduced as a diffusing stream axially upward into the lift path from a point within the catalyst bed beneath the lower end of the lift, that is, within the region of the compact mass below the cone of solids repose which normally tends to form as the catalyst flows inwardly toward the extended axis of the lift pipe. The diffusing gas may be similar in kind to that supplied in the stream discharging downwardly about the lift entrance, or it may be any other suitable gas. In any case, it is preferred that the downwardly moving stream constitute the primary flow of lift gas and the axially upwardly moving stream constitute the secondary flow of lift gas. For example, a suitable arrangement is to use as the primary lift gas a portion of the flue gases generated within the treating section of the system, and to use steam as the secondary or diffusing lift gas.

Regardless of whether the lift is to be operated by a gas stream originating from a single source within the engaging zone or by a gas stream comprising a mixture of gases originating from several sources therein an effective control of catalyst circulation rates may readily be maintained, within reasonable limits.

When the lift gas is introduced by only the downwardly discharging lift gas stream, the catalyst circulation rate may be controlled within limits by varying the volume of said lift gas. For any appreciable change in circulation rate, however, the major portion of the change may be effected by varying the vertical spacing between the lower end of the wall separating the lift path from the gas inlet path and the wall separating the gas inlet path from the path of the gravitating catalyst bed. Variation of this vertical spacing is readily accomplished by the expedient of providing an adjustable extension or liner for either of these walls, preferably the latter, so that the entire lower edge may be raised or lowered at will.

When the lift gas is to be a mixture of two gas streams, each introduced separately to the engaging zone, one discharging downwardly adjacent the entrance to the lift path and the other discharging axially upwardly toward the open lower end thereof, the lower ends of the walls separating the moving bed of catalyst from the primary gas stream, and the latter from the lift path may be fixed, and variations in catalyst circulation may be effected by controlling the flow of the secondary gas stream discharging upwardly into the lift path.

A fuller understanding of the novel method of this invention and of suitable means for carrying it out may be had by reference to the following description and claims taken in connection with the accompanying drawings forming a part of this application, in which:

Fig. 1 shows in elevation a schematic arrangement illustrating the application of a preferred embodiment of the invention to a typical catalytic cracking system in which a pneumatic lift is employed for elevating granular catalyst;

Fig. 2 is an enlarged sectional view of the lower lift hopper wherein catalyst is engaged by the lift gas and carried upwardly into the lift.

Figure 3:
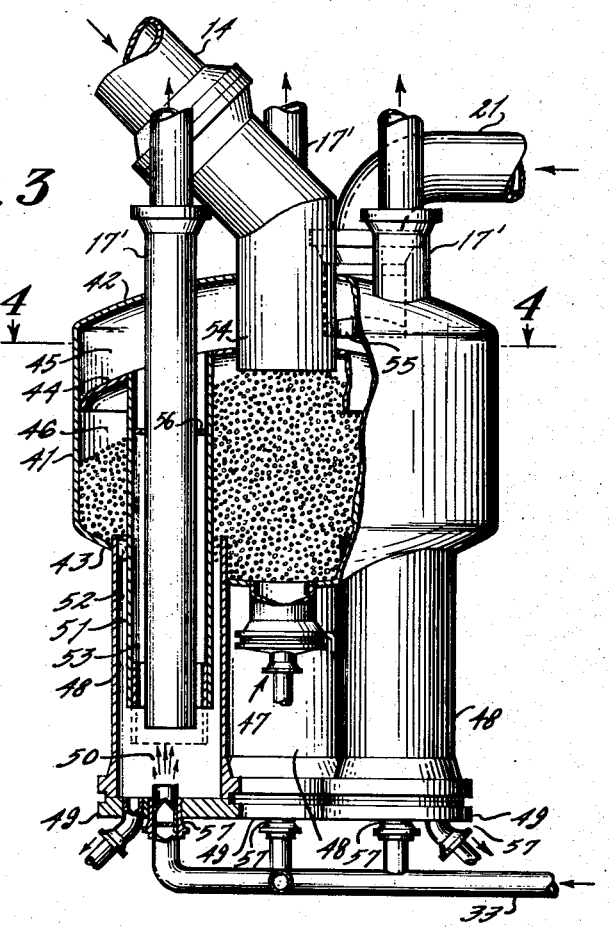
Fig. 3 is an elevation view showing the preferred embodiment as applied to a multiple lift.

Since the invention is directed primarily to that portion of the system in which the catalyst, after passing downwardly through the treating zones, is continuously being elevated for reuse in the system, and since the operation and construction of the hydrocarbon and catalyst treating units schematically shown in the drawing are adequately described in the aforementioned article appearing in the "Oil and Gas Journal," detailed illustration and description of the latter will be omitted for the sake of brevity.

In Fig. 1 of the drawing, granular catalyst is continuously withdrawn from the bottom of an upper lift hopper, designated by the numeral 11, and is passed by force of gravity downwardly through a seal leg 12 to the upper end of a combined reactor-regenerator or reactor-kiln, generally indicated by the numeral 13. In passing through the reactor-regenerator 13 the catalyst, gravitating as a compact moving bed, may pass successively through a zone in which the catalyst is contacted with hydrocarbon vapors under conditions effective to produce the desired conversion, a zone in which the gaseous products of conversion are separated from the catalyst, which has become contaminated by a deposit of coke thereon, a zone in which the carbonaceous deposit is removed from the catalyst, as by combustion in a kiln, and a zone in which the catalyst is separated from waste products of regeneration, such as the gaseous products of combustion.

Regardless of the particular procedure or type of treatment along the downward path, the reactivated or regenerated catalyst is withdrawn from the bottom of the reactor-regenerator 13 into a seal leg 14, through which it passes downwardly to a lower lift hopper 15 comprising a confined engaging zone 16 wherein the catalyst is picked up by a gaseous stream and conveyed upwardly through a vertical lift pipe 17 to the upper lift hopper 11.

The lower end of the lift pipe 17 is positioned centrally within the engaging zone 16 and passes through a concentric sleeve 18 extending from a point above the hopper 15 downwardly through the upper end of the hopper to a point adjacent the lower end of the lift pipe 17. The sleeve member 18 is suitably secured, as by welding, within an opening formed in the upper end of the hopper. The annular space 19 formed between the lift pipe 17 and the sleeve 18 is sealed at the upper end by an annular cover plate 20, attached to the outer wall of the lift pipe. Cover plate 20 may be removably secured in any conventional manner to the upper end of the sleeve, in order to facilitate dismantling of the apparatus for the purposes of inspection or repair. Sleeve 18 is provided with an inlet 21 through which a gaseous lift medium, such as flue gas, steam, or air, may be introduced to the engaging zone by passing downwardly through the annular space 19, inwardly under the lower edge of the lift pipe 17, and then upwardly through the lift pipe to a disengaging zone within the upper lift hopper 11.

The lift pipe 17 and its associated sleeve 18 terminate within the engaging zone 16 at points low enough to provide a region in which catalyst introduced in the upper region of the engaging zone through seal leg 14 may form a compact moving bed 22 of substantial depth. The moving bed 22 passes downwardly by gravity flow through the annular portion of zone 16 between the hopper wall and the sleeve 18 to the lower region of the engaging zone, below the lower ends of the sleeve and the lift pipe.

A sleeve extension or liner 23 is removably attached in any convenient manner to the lower end of sleeve 18, so that the vertical distance, arbitrarily called the sleeve height, between the lower end of the lift pipe 17 and the lower end of the sleeve 18 may be varied. It has been found that, within reasonable limits, the catalyst circulation rate may be varied by changing the sleeve height, and that, for any position of the sleeve extension 23, there is a limited range of variation in catalyst circulation rate which may be obtained by variations in the total amount of lift gas introduced into the engaging zone. The extension is therefore preferably initially set in accordance with predetermined lift requirements, and subsequent changes in the catalyst circulation rate are effected through other means, such as by controlling the introduction of gas into the engaging zone.

It will be noted from inspection of the drawing that the granular material or catalyst introduced through seal leg 14 into the upper region of the engaging zone 16 passes downwardly as a moving bed out of contact with any of the lift gas until it reaches the lower end of the sleeve 18, or its extension 23. At this point it moves inwardly toward the center of the chamber, merging with the gas stream discharging downwardly from the annular space 19 and being conveyed thereby upwardly into and through the lift.

While the preferred method of introducing lift gas to the engaging zone is downwardly in an annular stream surrounding the entire portion of the lift pipe 17 contained within the chamber 15, it should be apparent that other means of gas introduction are possible within the scope of the invention. A possible modification, for example, is to introduce lift gas through a distributing means encircling the lift pipe at its lower end, the gas being supplied to the distributing means in a confined stream passing laterally through the side wall of the hopper. It is apparent that such modification would permit an operation substantially identical to that provided by the construction shown in Fig. 1, in that the stream of lift gas could be discharged from the distributing means uniformly around the lower end of the lift pipe. It is also contemplated that, in a proper case, the lift conduit may be to one side of the engaging zone, instead of being centrally positioned therein, in which event an operation in accordance with the present invention may be carried out by introducing the gas as a downwardly discharging stream horizontally coextensive with that portion of the lift wall under which the mixture of gas and catalyst must pass in entering the lift path.

In the bottom wall of the hopper or chamber 15 an inlet 24, in axial alinement with the lift pipe 17, is provided for the introduction of a secondary stream of lift gas. The inner end of inlet 24 is spaced from the lower end of the lift pipe 17, so that gas discharging upwardly from the inlet may diffuse through the mixture of catalyst and lift gas immediately above, the gap therebetween being set to provide the desired flow characteristics of the catalyst entering the mouth of the lift pipe. If desired, the inlet 24 may be longitudinally adjustable, so that the distance between the end of the inlet 27 and the end of the lift pipe 17, arbitrarily called the gap, may be varied at will to control the operation of the lift.

The usual provisions for protecting the apparatus from erosion by impingement of the incoming gas or catalyst streams may be provided in the form of wear plate 25, secured to the outer surface of the lift pipe 17 opposite the gas inlet 21, and wear plate 26, secured to the outer surface of sleeve 18 opposite the discharge end of the seal leg 14.

Catalyst may be removed from the lower lift hopper through drain 27 provided in the bottom wall of the chamber 15, and access may be had to the interior of the chamber formed by hopper 15 through the usual covered manhole 28.

In operating the lift in accordance with the present invention, there is no limitation as to the kind of lift gas employed. This is true for both the primary stream of gas introduced through inlet 21 and the secondary stream of gas introduced through inlet 24. Each inlet may introduce the same kind of gas or they may introduce different gaseous materials. While flue gas, stream, and air are especially suitable for this purpose, it is to be understood that gaseous hydrocarbons or other gaseous reactants may be employed as the lift medium dependent upon the type of system in which the lift is employed. The piping arrangement illustrated in Fig. 1 is designed to permit the use of flue gas directly from the reactor-regenerator vessel 13, when flue gas is to be employed as the lift medium, or gas from other sources, not shown. In the former case, a portion of the flue gas discharging from the kiln section of vessel 13 through conduits 29 to the stack 30 may be diverted downwardly from the lower end of the stack through conduit 31 to the lower lift hopper 15. From conduit 31 flue gas is passed to the sleeve 18 through conduit 32, and to the inlet 24 through conduits 33 and 34. Flue gas, or any other gas, may be introduced to conduits 33 and 31 through conduit 35. Steam may be introduced through conduits 36 and 34 to inlet 24, and through conduits 37, 31, and 32 to inlet 21. Suitable valves and other devices may be provided to obtain the desired direction and conditions of gas flow.

If the gas within the engaging zone is incompatible with the gas in the zone from which the granular material is withdrawn through conduit 14, a seal gas which is compatible with both gases may be introduced into the latter through valved line 38. Since the lowermost zone of vessel 13 in the illustrated embodiment is a kiln, the use of hydrocarbon gases as a lifting medium would require the introduction of seal gas, such as steam, into the seal leg 14.

Figure 4:
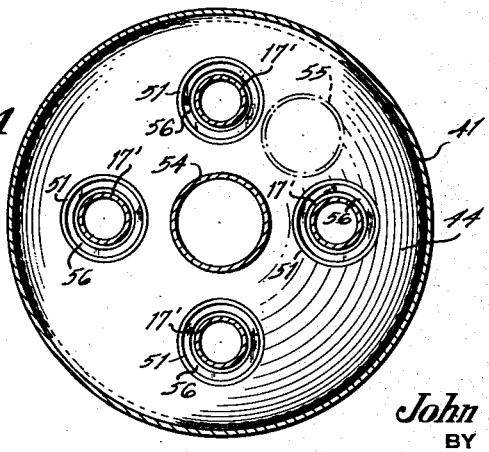
Fig. 4 is a sectional view taken along the line 4—4 of Fig. 3.

In Figs. 3 and 4 of the drawings, the invention in its preferred embodiment is shown in connection with a multiple lift arrangement in which a plurality of separate lift pipes are used to elevate the granular material from the lower lift hopper to the upper lift hopper.

In changing from a single lift pipe to a plurality of lift pipes, suitable provision is made in the design of the lower lift hopper to insure uniform distribution of lift gas to the several lift pipes, and the lower ends of the lift pipes are disposed within the moving bed of granular material in a manner to insure against the possibility of substantial gas migration from the region surrounding the lower end of one lift pipe to the regions surrounding adjacent lift pipes as a result of fluctuations in the operation of the lift pipes.

In Fig. 3, the lower lift hopper is shown as comprising a cylindrical body member 41 having upper and lower dished-heads 42 and 43 respectively. A transverse partition 44 in the upper portion of the vessel defined by the members 41, 42 and 43 separates the vessel into a plenum chamber 45 and a catalyst engaging zone 46. A combination manhole and catalyst drain outlet, generally indicated by the numeral 47, is provided centrally in the lower dished-head 43.

A plurality of elongated pipe sections 48 depend from the bottom of dished-head 43, the pipe sections being equi-spaced along a circumferential path about the axis of the body member 41. The lower ends of pipe sections 48 are closed by removable cover plates 49 secured thereto in any conventional manner. The pipe sections 48 correspond in number to the number of lift pipes employed, four being illustrated in the drawing, although fewer or more may be used. The pipe sections 48 form a plurality of elongated wells 50, which are merely segregated extensions of the catalyst engaging zone 46.

A corresponding plurality of pipe sections 51, secured at their upper ends to the transverse partition 44 and in open communication with the plenum chamber 45, depend concentrically within the pipe sections 48, the respective diameters of the pipe sections 48 and 51 being such as to provide a free annular path 52 therebetween for the passage of granular material from the upper enlarged region of the engaging zone 46 to the lower region of the wells 50 formed by the pipe sections 48.

The lift pipes 17' extend downwardly through the upper dished-head 42 and the transverse partition 44, and pass concentrically through pipe sections 51 to a point below the lower end thereof, thus providing annular spaces 53 between the lift pipes 17' and their associated pipe sections 51 for the passage of lift gas from the plenum chamber 45 to the lower region of the wells 50.

Granular material from seal leg 14 is introduced into the engaging zone 46 through an inlet 54 centrally positioned in the upper end of the lower lift hopper and passing through the plenum chamber 45, the discharge end of inlet 54 terminating in the upper region of the engaging zone 46 below the transverse partition 44. Lift gas from line 21 is introduced into the plenum chamber 45 through an inlet 55 provided in the upper dished-head 42. The lift gas may be flue gas, air, steam, hydrocarbons, etc. but, as in the case of the single lift, if incompatible gases are present in the zone from which the granular material is withdrawn and in the engaging zone, a gaseous sealing medium, such as steam, should be introduced in the seal leg 14 or in the upper region of the engaging zone 46 to prevent mixing of the incompatible gases.

In order to obtain uniform distribution of lift gas to the lower end of the lift pipes through annular spaces 53, a substantial pressure drop is introduced into each annular space 53. The necessary pressure drop may be obtained by constricting the flow area at some intermediate point along the annular path, such as by an annular orifice ring 56. The pressure drop introduced by orifice ring 56 and by the extended catalyst paths between the lower ends of adjacent lift pipes serves to substantially eliminate the possibility of pressure changes in the region about the lower end of one lift being reflected at the inlet to the other lifts.

Additional lift gas may be introduced to the engaging zone through inlets 57 situated at the bottom of each well 50 and adapted to direct a stream of gas axially upwardly toward the lower end of the lift pipes. Inlets 57 are supplied through line 33 with the lift gas from a common source, as shown in Fig. 1, the inlets being adapted to provide a uniform distribution of gas to the several lift pipes.

As in the case of the single lift pipe, the invention is not limited to an operation in which the primary flow of lift gas is introduced to the lower region of the engaging zone through annular confined paths surrounding the lift pipes. It is also not essential that the primary lift gas be distributed to the various lift pipes from a plenum chamber in the upper portion of the lower lift hopper. The invention may be carried out by any suitable arrangement effective to introduce lift gas from a common source of distribution uniformly to the lower end of each lift pipe or conduit in downwardly discharging streams, so that there is a uniform flow of lift gas along all portions of the lift inlet under which the catalyst and the gas must pass in reversing its direction of flow. In some cases, it may be preferred to introduce lift gas from a common source of distribution located centrally of the annular row of pipe sections 48, passing the gas along confined paths extending through the side walls of sections 48 and terminating in distributing means adapted to discharge the gas downwardly around the lower end of the lift pipe. Such confined paths also may be provided with means for introducing a substantial pressure drop, so that uniform distribution of lift gas to the various wells may be assured.

The present invention provides an improved gas lift of simple sturdy construction and efficient in operation. It has the advantage of keeping the streams of lift gas and catalyst separated until the actual lifting operation is effected and, in the case of a multiple lift, it has the further advantage of insuring complete and uniform distribution of the lift gas at or near each lift inlet. Consequently, if steam is being used as the lift medium, steam aging of the catalyst is substantially reduced and, if hydrocarbons are being used as the lift medium, it insures contact of the hydrocarbon gas only with catalyst being elevated.

In the latter case, such separation of lift gas and catalyst until the actual lifting operation is effected is especially desirable in that it may provide a temperature and reaction time control for the system.

What is claimed is:

1. In a cyclic process involving a continous circulation of granular contact material along a path having an elongated downflow portion through which said material gravitates as a longitudinally continuous compact moving mass, an elongated upflow portion comprising at least one confined lift path through which said contact material is elevated by means of lift gas, and a return portion, connecting the upper ends of said upflow and downflow portions, through which the elevated contact material is returned to a free surface at the uppermost level of said compact moving mass the method which comprises the steps of passing said contact material at the lower end of its downflow path into a confined engaging zone containing the lower end portion of said confined lift path, said contact material within said engaging zone forming a compact bed encircling and extending a substantial distance below said lower end portion, introducing lift gas within said compact bed to engage said contact material and convey the same upwardly to and through said confined lift path, the primary portion of said lift gas being conveyed through a portion of said compact bed as a confined stream out of contact with said granular material and discharging downwardly into said compact bed as an annular stream surrounding and adjacent to the lower periphery of said confined lift path so as to entrain and elevate said contact material through said confined lift path, and the remaining secondary portion of said lift gas discharging directly into said compact bed at a location axially below the lower end of said confined lift path so as to diffuse upwardly through the moving portion of the compact bed below the cone of solids repose at the inlet to said confined lift path, disengaging said contact material from said lift gas at the upper end of said upflow portion before passing the contact material through said return portion, and controlling the rate of circulation of said contact material by controlling the flow of said secondary portion of lift gas.

2. A method as in claim 1 in which said upflow portion comprises a plurality of confined lift paths each having its lower end portion positioned within a compact bed of said contact material supplied from the lower end of said downflow portion of the path of circulation.

3. A system for continuously circulating frangible granular contact material along a path having a downflow portion, wherein said contact material gravitates as a continuous compact moving mass while being contacted by gaseous reactants, and an upflow portion, wherein said contact material is pneumatically elevated for return to said downflow portion, comprising: means laterally confining said compact moving mass during its gravitational flow, said means including one or more enlarged gas-contact chambers wherein said compact mass gravitates in the form of an expanded moving bed and a conduit for withdrawing said compact moving mass from the lowermost of said chambers, a hopper in open communication with the lower end of said conduit and adapted to maintain an uninterrupted flow of said compact moving mass into and downwardly within said hopper, an upwardly extending elongated lift pipe having its lower open end located within the lower region of said hopper and within said compact moving mass, a cylindrical member concentrically surrounding the lower end portion of said lift pipe and being spaced therefrom to provide an annular passage in open communication with said moving bed only along the lower perimeter of said lift pipe means for introducing lift gas into said annular passage, and means for introducing an additional but secondary amount of lift gas axially upward from a location beneath each of said lift pipes and wholly within the compact moving mass of contact material gravitating below the lift pipe, said location being below the cone of repose of the contact material flowing downwardly and inwardly from the lower perimeter of said cylindrical member.

References Cited in the file of this patent

UNITED STATES PATENTS

| | | |
|---|---|---|
| 528,417 | Duckham | Oct. 30, 1894 |
| 528,418 | Duckham | Oct. 30, 1894 |
| 1,390,974 | Von Porat | Sept. 13, 1921 |
| 1,549,285 | Baker | Aug. 11, 1925 |
| 2,414,373 | Gerhold | Jan. 14, 1947 |
| 2,493,911 | Brandt | Jan. 10, 1950 |
| 2,561,771 | Ardern | July 24, 1951 |
| 2,616,521 | Berg | Nov. 4, 1952 |

FOREIGN PATENTS

| | | |
|---|---|---|
| 7,075 | Holland | Mar. 18, 1922 |
| 589,201 | France | May 25, 1925 |